United States Patent
Smolka et al.

(10) Patent No.: US 12,112,069 B2
(45) Date of Patent: Oct. 8, 2024

(54) MEMORY MODULE AND COMPUTING DEVICE CONTAINING THE MEMORY MODULE

(71) Applicant: AI Plus, Inc., San Jose, CA (US)

(72) Inventors: John Michael Smolka, Felton, CA (US); Carlos Rene Weissenberg, Placerville, CA (US)

(73) Assignee: AI Plus, Inc., San Jose, CA (US)

( * ) Notice: Subject to any disclaimer, the term of this patent is extended or adjusted under 35 U.S.C. 154(b) by 0 days.

(21) Appl. No.: 18/080,720

(22) Filed: Dec. 13, 2022

(65) Prior Publication Data

US 2023/0113337 A1 Apr. 13, 2023

Related U.S. Application Data

(63) Continuation of application No. 16/906,876, filed on Jun. 19, 2020, now Pat. No. 11,526,302.

(60) Provisional application No. 62/864,248, filed on Jun. 20, 2019.

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0653* (2013.01); *G06F 3/0679* (2013.01)

(58) Field of Classification Search
CPC .... G06F 3/0659; G06F 3/0604; G06F 3/0634; G06F 3/0653; G06F 3/0679
See application file for complete search history.

(56) References Cited

U.S. PATENT DOCUMENTS

| | | |
|---|---|---|
| 2011/0153916 A1 | 6/2011 | Chinnaswamy et al. |
| 2018/0039586 A1 | 2/2018 | Devaux et al. |
| 2019/0079881 A1 | 3/2019 | Nakazono et al. |
| 2019/0243788 A1 | 8/2019 | Stonelake et al. |
| 2020/0006367 A1 | 1/2020 | Krutzik et al. |
| 2020/0035291 A1* | 1/2020 | Kasibhatla .......... G11C 11/4093 |
| 2020/0117597 A1 | 4/2020 | Huang et al. |
| 2020/0293319 A1 | 9/2020 | Lee et al. |
| 2020/0401352 A1 | 12/2020 | Smolka et al. |

OTHER PUBLICATIONS

United States Patent and Trademark Office, U.S. Appl. No. 16/906,876, Final Office Action dated Jan. 28, 2022.
United States Patent and Trademark Office, U.S. Appl. No. 16/906,876, Non-Final Office Action dated Aug. 3, 2021.
United States Patent and Trademark Office, U.S. Appl. No. 16/906,876, Notice of Allowance dated Jul. 27, 2022.

* cited by examiner

*Primary Examiner* — Edward J Dudek, Jr.
(74) *Attorney, Agent, or Firm* — Shield Intellectual Property PC; Kirk D. Wong

(57) ABSTRACT

Memory module, computing device, and methods of reading and writing data to the memory module are disclosed. A memory module, comprises one or more dynamic random-access memories (DRAMs); and a processor configured to select a Central Processing Unit (CPU) or the processor to communicate with the one or more DRAMs via a memory interface.

22 Claims, 11 Drawing Sheets

MEMORY MODULE AND COMPUTING DEVICE CONTAINING THE MEMORY MODULE

CROSS-REFERENCE TO RELATED APPLICATIONS

This application claims the benefit as a Continuation of U.S. application Ser. No. 16/906,876, filed Jun. 19, 2020, entitled MEMORY MODULE AND COMPUTING DEVICE CONTAINING THE MEMORY MODULE, which claims benefit of U.S. Provisional Patent Application Ser. No. 62/864,248, filed Jun. 20, 2019, entitled AI DIMM OR GPU DIMM CONNECTED DIRECTLY TO THE DDR4/5 MEMORY INTERFACE FOR AI OR GPU COMPUTATIONS, the entire contents of the foregoing are hereby incorporated by reference as if fully set forth herein, under 35 U.S.C. § 120.

FIELD

The embodiments herein relate to computer peripheral devices, specifically to memory modules, computing device and methods of reading or writing data to the memory module.

BACKGROUND

Currently, artificial intelligence (AI) and graphics processing unit (GPU) devices are connected to a peripheral component interconnect express (PCIe) interface to communicate with a central processing unit (CPU). A PCIe interface is packet based, resulting in less performance, and is much slower than a DDR4/5 memory interface in throughput of data.

As well, for AI applications, due to the data throughput limitation of the PCIe interface, the current PCIe interface connection scheme cannot keep up with the AI capabilities and the amount of data processed by the PCIe interface becomes a bottleneck in AI applications.

SUMMARY OF INVENTION

The memory module disclosed in the present application allows a central processing unit (CPU) to access the processed results by a processor, such as an FPGA, of the memory module, such as processed graphics or images or computational results, via a double data rate (DDR) interface. As such, the memory module may reduce the latency and increase the data throughput between the CPU and the processor. The processor may perform the same functions as a GPU but communicate with the CPU with a DDR interface, rather than a PCIe interface.

As well, the processor of the memory module disclosed in the present application may be configured to perform artificial intelligence (AI) inferencing using AI algorithm or model. The memory module allows the CPU to transmit data to the memory module for the processor to process with AI algorithm or model. The AIDIMM further increases the overall speed of processing, and the latency may be improved by up to 2-100 times from the data transferred between the CPU and the processor, such as an FPGA, and between the memory module to the CPU.

In addition, the memory module disclosed in the present application may be configured to be used as a persistence memory. The memory module allows the CPU to transmit data to the memory module and for the processor to store the data in storage flash. In addition, the memory module allows for the processor to retrieve data stored in the storage flash to make the data available for the CPU to read the data stored in the storage flash. For example, the memory module allows the CPU to store data and then retrieve the data from the persistence memory at a time as needed by the CPU.

In an aspect, there is provided a memory module, comprising: one or more dynamic random-access memories (DRAMs); and a processor configured to select a Central Processing Unit (CPU) or the Processor to communicate with the one or more DRAMs via a memory interface.

In another aspect, in the preceding memory module, the interface is a double data rate 4 (DDR4) interface or double data rate 5 (DDR5) interface.

In another aspect, in the preceding memory modules, each of the CPU and the processor has master memory interface and the DRAM has a slave memory interface, and the master memory interface and the slave memory interface communicate via the memory interface.

In another aspect, in the preceding memory modules, the memory module has a local mode and a host mode.

In another aspect, in the preceding memory modules, in the local mode, the processor writes or reads from the DRAMs.

In another aspect, in the preceding Memory modules, in the host mode, the CPU writes or reads from the DRAMs.

In another aspect, the preceding memory modules further comprises one or more multiplexers for switching the memory module between the local mode and host mode.

In another aspect, in the preceding memory modules, the processor is configured to control states of the multiplexers In another aspect, in the preceding memory modules, the multiplexers includes a first multiplexer for switching command, control, and address (CCA) signals and a second multiplexer for controlling access to the DRAM.

In another aspect, the preceding memory modules further comprises a storage flash that has a storage capacity of less than 1 TB or greater than or equal to 1 TB.

In another aspect, the preceding memory modules, further comprising a storage flash that has a storage capacity of 1 to 4 TB or more.

In another aspect, in the preceding memory modules, the memory module is used as a persistent memory module.

In another aspect, in the preceding memory modules, the processor is a Field Programmable Gate Array (FPGA).

In another aspect, in the preceding memory modules, the FPGA performs graphics processing unit (GPU) or co-processing functions.

In another aspect, in the preceding memory modules, the FPGA is a master to communicate with the CPU.

In another aspect, in the preceding memory modules, the FPGA is configured to infer data of a file when the CPU sends the file to the memory module.

In another aspect, in the preceding memory modules, the FPGA includes Artificial Intelligence (AI) inferencing algorithms or models to perform AI inferencing.

In another aspect, in the preceding memory modules, the memory module is a dual in-line memory module (DIMM).

In another aspect, there is provided a computing device, comprising: one or more memory module, each memory module comprising: one or more dynamic random-access memories (DRAMs); and a processor configured to select a central Processing Unit (CPU) or the Processor to communicate with the one or more DRAMs by via one or more memory interfaces.

In another aspect, the memory module is a dual in-line memory module (DIMM).

In another aspect, there is provided a method of reading or writing data to a memory module, comprising: setting, by a processor of the memory module, the memory module to a local mode and one or more dynamic random-access memories (DRAMs) of the memory module to an idle mode; and reading or writing data, by the processor, from one or more dynamic random-access memories (DRAMs) of the memory module, via one or more memory interfaces.

In another aspect, the preceding method further comprises notifying, by the processor, a Central Processing Unit (CPU) after the processor has completed reading or writing data to the one or more DRAMs.

In another aspect, the preceding methods further comprises setting, by the processor, the memory module to a host mode and setting the one or more DRAMs state to idle.

In another aspect, in the preceding methods the one or more memory interfaces are double data rate 4 (DDR4) interfaces or double data rate 5 (DDR5) interfaces.

In another aspect, there is provided a method of reading or writing data to a memory module, comprising: setting, by a processor of the memory module, the memory module to a host mode and one or more dynamic random-access memories (DRAMs) of the DIMM to an idle mode; and reading or writing data, by a central Processing unit (CPU), from one or more dynamic random-access memories (DRAMs) of the memory module, one or more memory interfaces.

In another aspect, the preceding methods further comprise notifying, by the CPU, the processor after the CPU has completed reading or writing data to the one or more DRAMs.

In another aspect, the preceding methods further comprise setting, by the processor, the memory module to a host mode and setting the one or more DRAMs state to idle.

In another aspect, in the preceding methods, the one or more memory interfaces are double data rate 4 (DDR4) interfaces or double data rate 5 (DDR5) interfaces.

In another aspect, there is provided a method of reading or writing data to a memory module, comprising: setting, by a processor of the memory module, one or more dynamic random-access memories (DRAMs) of the memory module to an idle mode; and selecting, by the processor, one of a central processing unit or the processor writing data from or reading data to one or more dynamic random-access memories (DRAMs) of the memory module, via one or more memory interfaces; and setting the DRAMs to a corresponding mode of the memory module.

In another aspect, the preceding methods further comprise setting, by the processor, the DRAMs to an busy mode when the central processing unit or the processor writing data from or reading data to one or more DRAMs of the memory module.

In another aspect, the preceding methods further comprise setting, by the processor, the DRAMs to the idle mode after the central processing unit or the processor completes writing data from or reading data to one or more DRAMs of the memory module.

In another aspect, in the preceding methods, the processor is one or more Field Programmable Gate Arrays (FPGAs).

In another aspect, in the preceding methods, the memory module is a dual in-line memory module (DIMM).

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
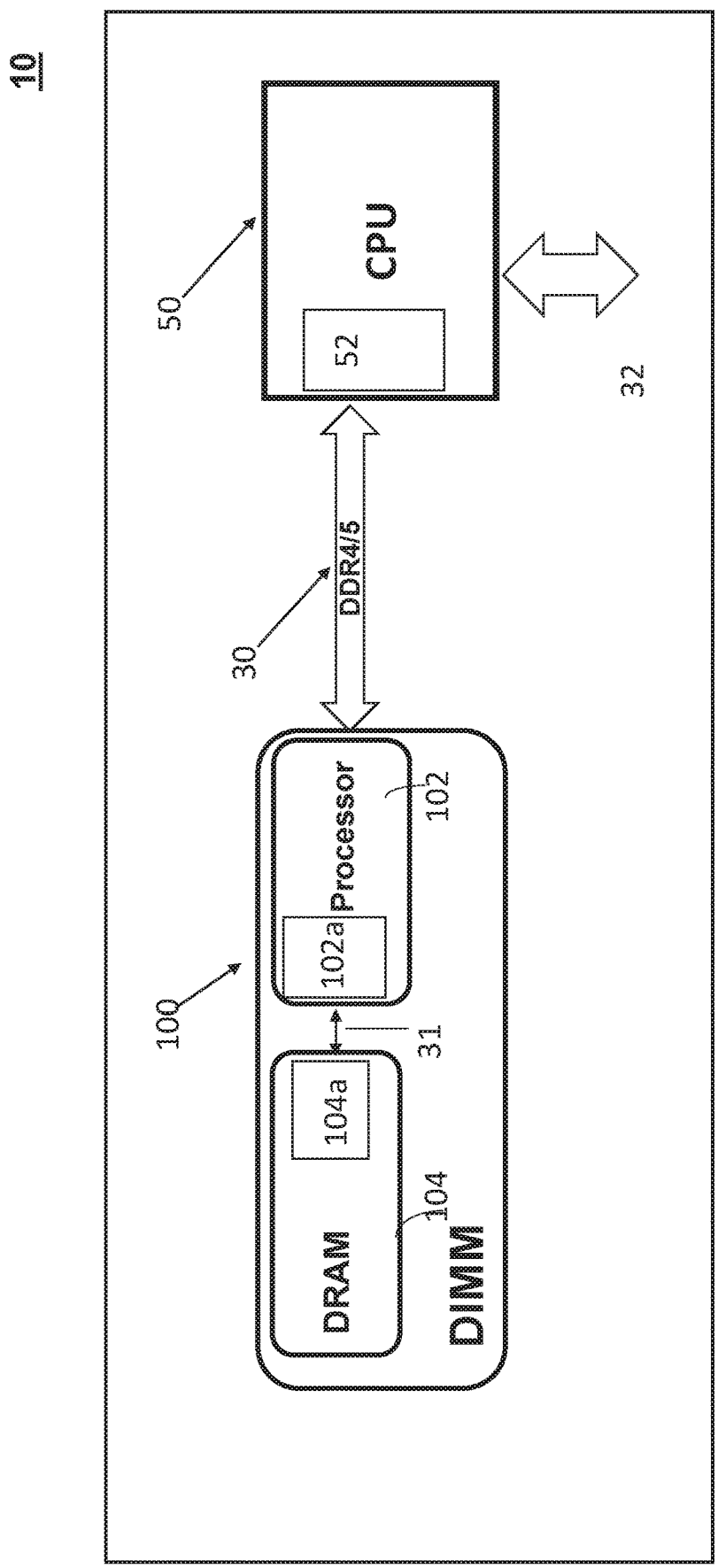
FIG. 1 is a block diagram showing the architecture of a computing device.

FIG. 1 illustrates an exemplary structure of a computing device 10. The computing device 10 may be any electronic device that has the computing power and memory storage capacity, for example, a computer, a workstation, or a server. The computing device 10 may include at least one central processing unit (CPU) 50, or a host, at least one memory module 100 or 150, and at least one interface, such as DDR4/5 30 for communications between the CPU and memory module 100 or 150. The computing device 10 may also include other interfaces 32, such as PCIe, and/or UPI interfaces. A traditional PCIe interface, which is an asynchronous interface, may be used to connect a GPU to CPU.

In the example of FIG. 1, the CPU 50 interacts with the memory module 100 or 150 via the interface 30, and carries out the instructions of a computer program by performing the arithmetic, logical, control and input/output (I/O) operations specified by the instructions. The CPU 50 includes a memory controller 52, which contains the logic for write and read operation of the data to the memory module 100 or 150. When the data are communicated between the memory module 100 or 150 and the CPU 50, the CPU 50 may write data to the memory module 100 and read data from the memory module 100 via the memory controller 52 via interface 30.

In the example of FIG. 1, the CPU 50 support persistent memory mode. Persistent memory mode is a Linux standard that is supported by different CPUs and different Operating Systems (OS) such as Redhat and Suse. The memory module 100 may be used as a persistent storage device. The CPU 50 may not interleave the data being written to the memory module 100 with other memory modules in different memory channels. The CPU 50 may have the capability to write a complete file to one memory module 100.

The memory module 100 or 150 receives data from the CPU 50 and stores data in a write operation of the computing device 100. In the example of FIG. 1, the memory module 100 may be one or more dual in-line memory modules (DIMMs). A DIMM is a standard module defined by the Joint Electron Device Engineering Council (JEDEC). A DIMM may be plugged into memory bus sockets (DIMM socket) of the computing device 100.

Figure 2:
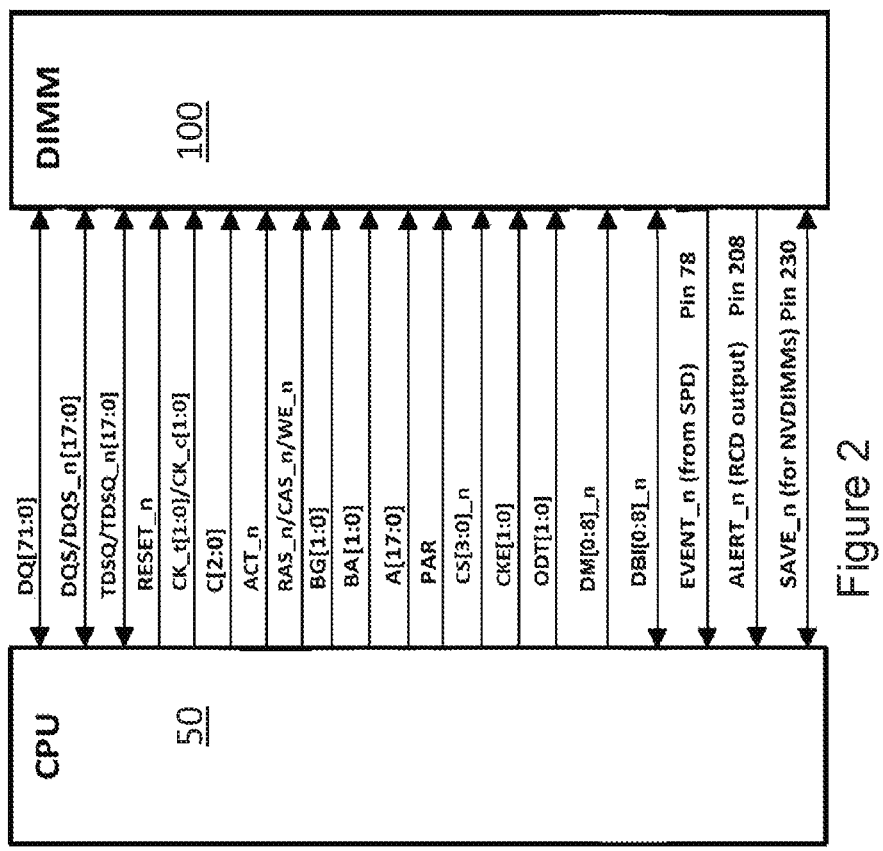
FIG. 2 illustrates an exemplary interface between a CPU and a DIMM, according to an embodiment of the present disclosure.

A DIMM uses dual data rate (DDR) protocol, such as DDR4 or DDR5, to execute write/read operations. DDR protocol is a synchronous interface and may be deployed using master slave topology. The interface 30 may be a DDR4 or DDR5 interface. In DDR protocol, operations, such as read/write operations, are completed within a predetermined and fixed time duration between the start time and the completion time of a request. FIG. 2 illustrates an exemplary interface for the memory module 100 or 150, which may be a DIMM, and the CPU 50 to communicate with each other using a JEDEC JESD248A NVDIMM-N defined DDR4 interface and communication protocol. NVDIMM-N host and device interface specifications may be found in JEDEC JESD24SD. In some examples, the memory module 100 may be directly connected to the CPU 50 via a DDR interface, such as a DDR4 or DDR5 interface.

Figure 3:
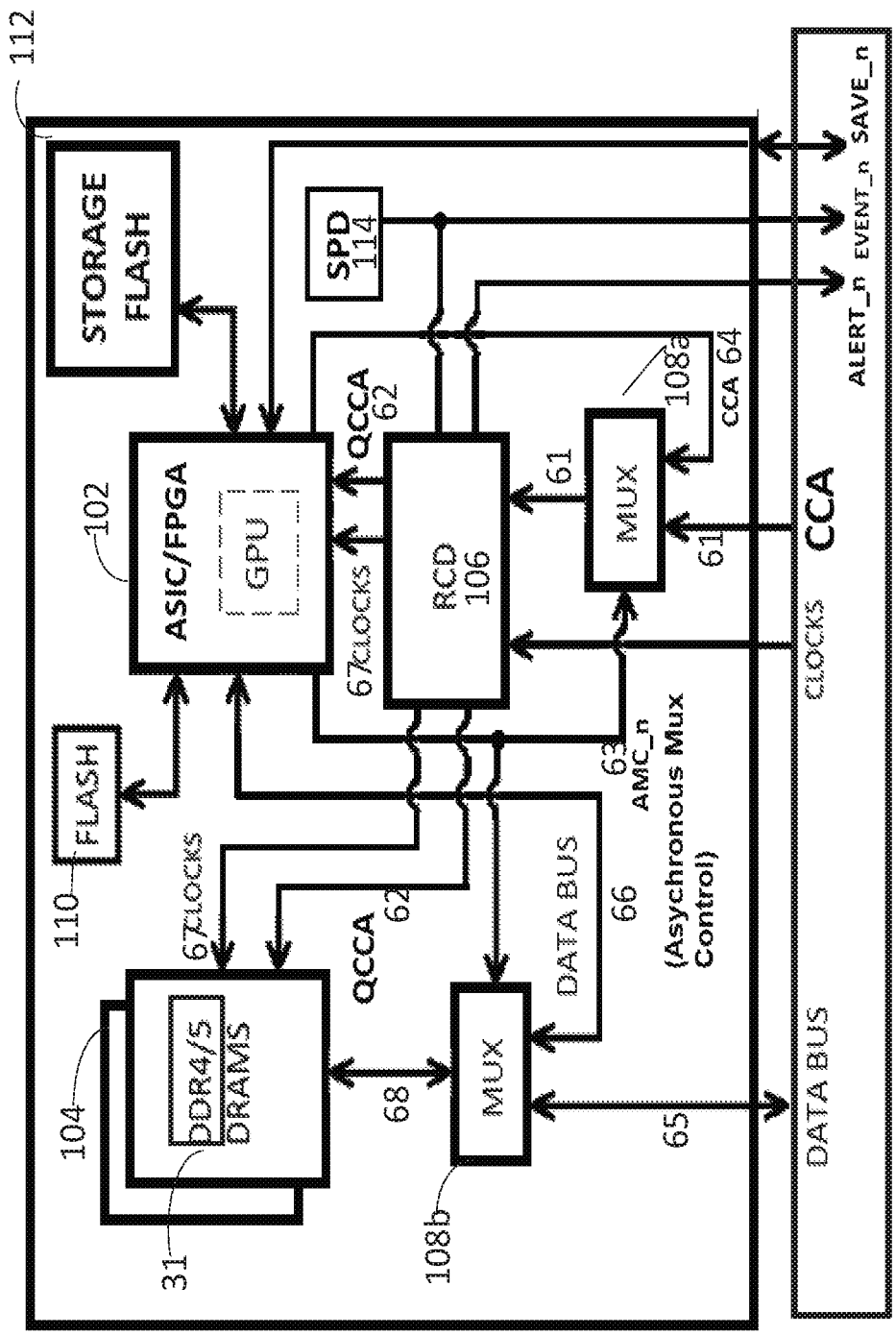
FIG. 3 is a block diagram showing a structure of the memory module according to an embodiment of the present disclosure.

In the examples of FIG. 3, the memory module 100 may include a processor 102, and one or more dynamic random-access memory(ies) (DRAMs) 104. The DRAMs 104 may be plugged onto the memory bus of the memory module 100. In the present application, the DRAMs 104 may also be other low latency memory medium, such as 3D Xpoint. DRAM functional specifications may be found in JEDEC JESD79-4B.

The processor 102 may act as a local controller of the memory module 100 to coordinate with the CPU 50 in various operations. The pins AlERT_n, SAVE_n, or EVENT_n in FIG. 2 may be used for the communications between the processor 102 of the module 100 and the CPU 50. The processor 102 may act as a master to communicate with the CPU 50, which acts as a slave. The processor 102 may be configured to coordinate with CPU 50 via the interface 30 and the DRAM 104 in operations such as read and write operations. For example, programs or instructions may be stored in a memory such as a non-volatile memory, the processor 102 may be coupled to the memory to execute the programs or instructions, including AI algorithm and model. When the instructions are executed by the processor 102, the processor 102 may regulate or control communications between the CPU 50 with the DRAMs 104 via the memory interface 30, and communications between the processor 102 and the DRAMs 104. In the example of FIG. 3, the processor 102 may also be an application-specific integrated circuit (ASIC), or a Field Programmable Gate Array (FPGA).

The communications may include write or read data operations between the between the CPU 50 with the DRAM 104, or write or read data operations between the processor 102 and the DRAM 104. The communications may also include communicating control signals such as command, control, and address (CCA), in order for the CPU 50 or the processor 102 to control and access the DRAM 104, and to read or write from the DRAM 104.

The DRAM 104 may be a memory buffer when data or a file is reading from the DRAM 104 or writing to the DRAM 104. The DRAM 104 may communicate with the CPU 50 or the processor 102 via memory interfaces 104a in FIG. 1. In some examples, the memory interface 104a of DRAM 104 may be a slave memory interface controlled by either the CPU 50 or the processor 102. The CPU 50 has a master memory interface 52 and the processor 102 has a master memory interface 102a. The master memory interfaces 52a and 102a provide commands to the slave memory interface 104a via the respective memory interfaces 30 and 31. The slave memory interface 104a responds to the commands which allow the CPU 50 or the processor 102 to read or write data in the DRAM 104, or to perform other operations.

FIG. 3 illustrates an example of a structure of the memory module 100. The memory 100 may also include a RCD 106, a first Mux 108a and a second Mux 108b. Mux 108a and 108b may be standard mux used in the NVDIMM-N.

In the example of FIG. 3, the CPU 50 may send a command, control, and/or address (CCA) 61 to Mux 108a. The command, control, and address are signals for the CPU 50 to control and access the DRAM 104 when the CPU 50 reads from or writes to the DRAM 104 in a host mode. As illustrated in FIG. 3, the Mux 108a forwards the CCA 61 to the Register Clock Driver (RCD) 106. RCD functional specifications may be found in JEDEC JESD82-31A.

Figure 5:
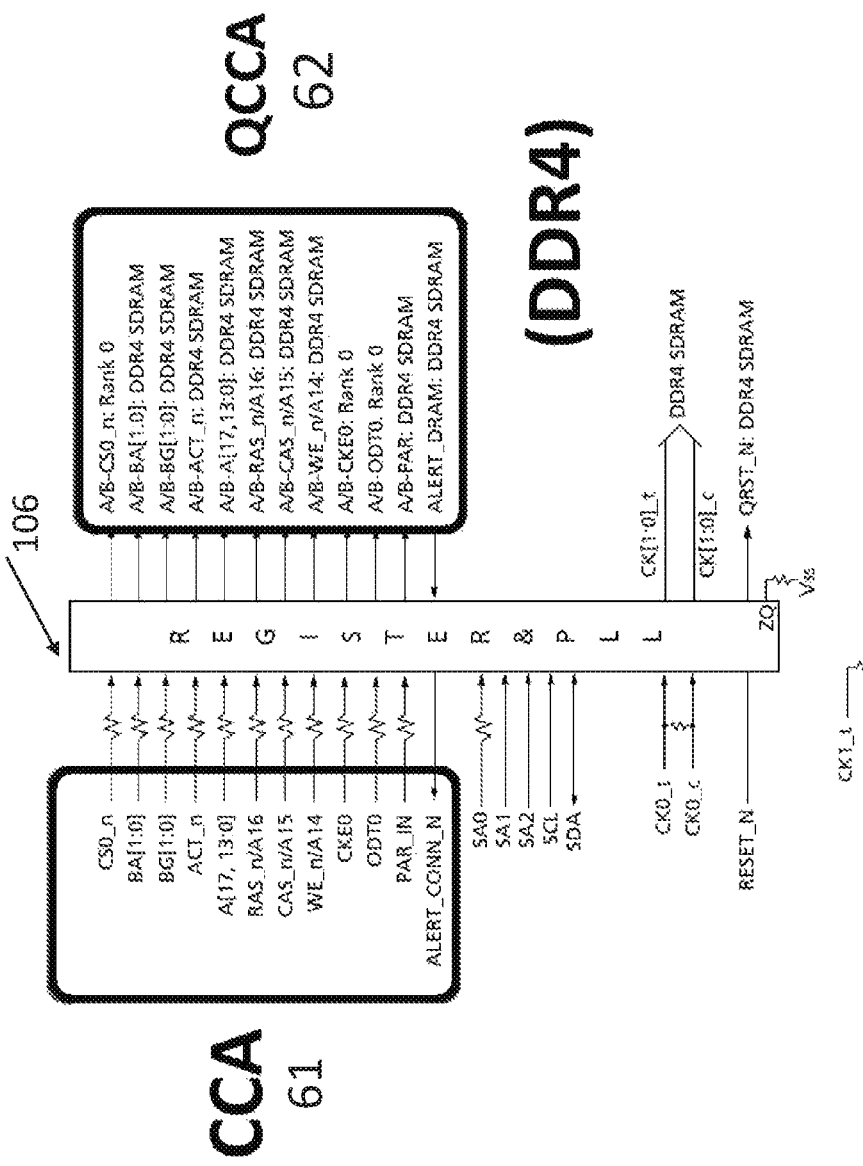
FIG. 5 is a block diagram showing a RCD converting CCA to QCCA.

The RCD 106 may convert CCA 61 to QCCA 62 signals and sends the QCCA 62 signals to each of the DRAM 104 and the processor 102. As illustrated in FIG. 5, the CCA 61 signals input to the RCD 106 include CS0_n, BA[1:0], BG[1:0], ACT_n, A [17, 13:0], RAS_n/A16, CAS_n/A15, WE_n/A14, CKE0, ODT0, and PAR_IN. After the CCA 61 signals input into the RCD 106, the RCD 106 converts the CCA 61 signals to the QCCA 62 signals for DDR protocol and the DRAM 104, and outputs signals A/B-CS0_n:Rank 0, A/B-BA[1:0]:DDR4 SDRAM, A/B-BG[1:0] :DDR4 SDRAM, A/B-ACT_n:DDR4 SDRAM, A/B-A [17, 13:0]: DDR4 SDRAM, A/B-RAS_n/A16:DDR4 SDRAM, A/B-CAS_n/A15:DDR4 SDRAM, A/B-WE_n/A14:DDR4 SDRAM, A/B-CKE0:Rank 0, A/B-ODT0: Rank 0, and A/B-PAR:DDR4 SDRAM. As well, the input signal ALERT_DRAM: DDR4 SDRAM from DRAM 104 and the processor 102 may be converted to ALERT_CONN_N signals, which are output to the CPU 50. The RCD 106 also receives clock signals 67, such as CK0_t and CK0_c, CK1_t, and CK1_c in FIG. 5, from the CPU 50 and then forwards the clock signals 67, such as CK[1:0]_t and CK[1:0]_c in FIG. 5, to each of the processor 102 and the DRAM 104 for communicating in DDR protocol. The RCD 106 also receives a Reset_n signal and converts it to a QRST_N signal for DDR4 protocol. SCL is an I$_2$C serial bus clock for the SPD/TS and RCD 106. SDA is an I$_2$C serial bus data line for the SPD/TS and RCD 106. SA0-SA2 are I$_2$C slave address select for SPD/TS and RCD 106.

The address in CCA 61 and QCCA 62 specifies the physical address of the individual memory block of DRAM 104 to be accessed by the CPU 50 or the processor 102.

The CPU 50 provides master clock signals 67 to the memory module 100. All communications, including data reading and writing, between the CPU 50 and memory module 100, and between the processor 102 and the DRAM 102 are synchronized to the master clock signals 67. As well, master clock signals 67 are continuous and consistent during the entire operation of the computing device 10, including transitioning from host mode to local mode and vice-versa. The host mode and local mode will be discussed in greater detail below.

In operation, the CPU 50, the processor 102, the RCD 106 and the DRAMs 104 are synchronized to the clock signal 67. For example, CPU 50 trains or initializes RCD 106 and DRAMs 104. The processors 102 snoops the Commands, Control, and Address bus on CCA 61, and synchronizes with these commands using an internally generated clock. By snooping, the processor 102 may save the parameters of the CPU 50 to initialize the DRAMs 104. After the CPU 50 is initialized, the CPU 50 signals to the processor 102, such as an FPGA, through the initialized RCD 106 (via the RCW mode register command) for the processor 102: a) Clock signals 67 from CPU 50 is kept running and constant; b) signal muxes 108a and 108b isolate the memory channel from the CPU 50; and c) the processor 102, such as an FPGA, then writes through the RCD 106 inputs to train the processor 102 to synchronize with the RCD 106. With the snooped DRAM parameters, and the trained processor 102 and RCD 106, the processor 102 tests to ensure DRAM interface 104a works properly. After the processor 102 is synchronized with DRAM 104, the processor 102 communicates with CPU 50 with a signal, such as the AlERT_n, SAVE_n, or EVENT_n in FIGS. 2 and 3, or other available signals, via the RCD 106 using the RCW control word, to re-control the memory bus. As such, the CPU 50, the processor 102, the RCD 106 and the DRAMs 104 are synchronized to the clock signal 67, and can handshake the memory bus control.

Figure 4:
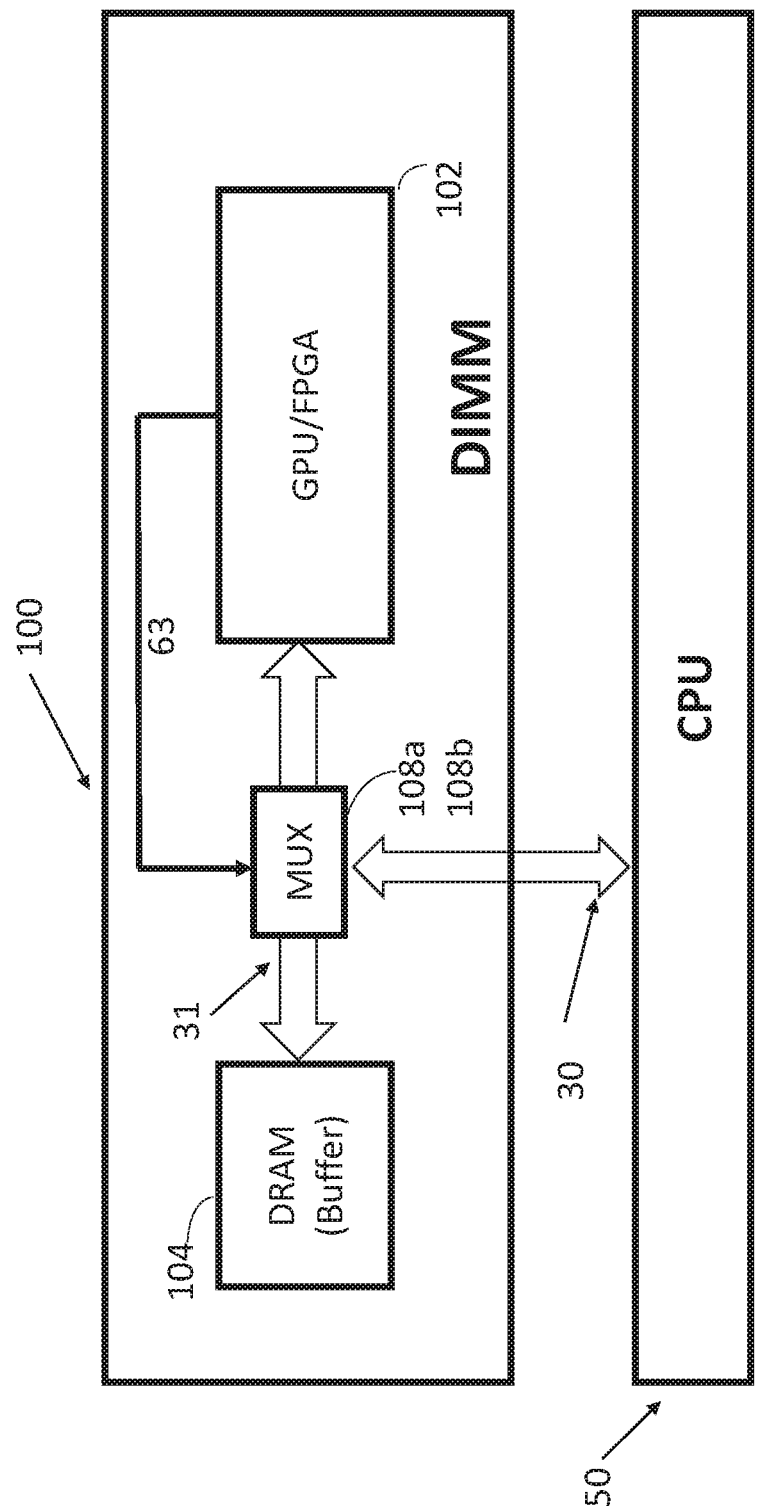
FIG. 4 is a block diagram showing components and interfaces of the memory module according to an embodiment of the present disclosure.

As illustrated in FIGS. 3 and 4, the processor 102 sends asynchronous Mux control command (AMC_n) 63 for controlling the state of the first and second Mux 108a and 108b. Mux 108a and 108b are multiplexers for selecting an input among multiple inputs using control signals from the processor 102. In other words, the processor 102 controls the memory module 100 to switch between a host mode and local mode with the AMC_n 63. In this case, the processor 102 acts as a master rather than as a slave in order to respond to the CPU 50 in a timely. After receiving the AMC_n 63 from the processor 102, the Mux 108a and 108b switches the memory module between a host mode and local mode. The memory module 100 is in a host mode when the CPU or host 50 has control and access to the DRAM 104, such as write to or read from the DRAM 104, via the memory interface 30. The memory module 100 is in a local mode when the processor 102 accesses the DRAM 104, such as write to or read from the DRAM 104, via the memory interface 31. As such, the DRAM 104 is accessed one at a time by either the CPU 50 or the processor 102.

After receiving the AMC_n 63, the Mux 108a and 108b switches to one of the host mode and the local mode. In the host mode, the CPU 50 is the master, and the Mux 108a receives CCA 61 from the CPU 50 and allows the CPU 50 to perform write or read operation based on the CCA 61, and the Mux 108b allows the CPU 50, for example, by handshaking memory bus control, to access the DRAM 104 to perform write or read operation via the data bus 65 and data bus 68. After the CPU 50 completes reading and writing to the DRAM 104, the CPU 50 sends Alert_n, Save_n, or Event_n commands to the processor 102 to convert the host mode to the local mode.

In the local mode, the processor 102 is the master, the Mux 108a receives CCA 64 from the processor 102 and allows the processor 102 to perform write or read operation based on the CCA 64, and the Mux 108b allows the processor 102 to access the DRAM 104 to perform write or read operation via the data bus 66 and 68. The data bus 65 or 66 transfers data or files in data write or read operation to and from DRAMs 104 via data bus 68. After the processor 102 completes reading or writing to the DRAM 104, the processor 102 informs the CPU 50 via an Alert_n, Save_n, or Event_n Command. The processor 102 then converts the local mode back to the host mode. If the processor is in an unusual or error state, the CPU 50 may command the processor 102 to switch the local mode back to host mode via an I2C bus. The DDR interface 30 or 31, such as DDR4 or DDR5, include data bus 65 or 66 for carrying bidirectional data transfer and CCA 61 bus and QCCA 62 bus for transferring command or address.

In some examples, the memory module 100 may include a serial presence detect (SPD) 114. The SPD is the JEDEC standard EEPROM chip. SPD 114 is a standardized way to automatically access information about a DRAM 104 of the memory module 100.

In some examples, the memory module 100 may include a flash 110, which may be a non-volatile computer memory storage medium that can be electrically erased and reprogrammed. Programs and instructions for the processor 102 to execute may be stored in the flash 110.

In some examples, the memory module 100 may also include a storage flash 112, which may be used as a persistence memory. The storage flash 112 is controlled by the processor 102. When using the storage flash 112 as a persistent memory, the DRAM 104 is used as buffer memory. The CPU 50 writes/reads data to the DRAM 104. The processor 102 is then programmed to read/write the data from the DRAM 104 and to write/read the data to the storage flash 112. As such, the storage flash 112 may be used by the CPU 50 as persistent memory. In addition, the processor can be programmed to automatically transfer data from the DRAM to the storage flash. For example, when the processor 102 is a FGPA, the FPGA can be programmed to use the storage flash 112 as needed. The memory module 100 may include an auto-save function that saves the data if the power is lost.

In some examples, the storage flash 112 has a storage capacity of less than 1 TB, or more than 1 TB. In some examples, the storage flash 112 has a storage capacity of 1 to 4 TB, or more than 4 TB, in this case, the memory module 100 may be called as a TERADIMM. The storage capacity of the storage flash 112 may be changes based on specific applications.

In a conventional CPU architecture and flow, such as a processing flow of a Compute Unified Device Architecture (CUDA), the CPU copies the data from the Main Memory from the CPU to the GPU Memory. After the GPU read the data from the GPU memory, processes the data, and save the data on the GPU, the CPU copies the processed data by the GPU from the GPU Memory to the Main Memory of the CPU for processing. When the CPU copies the data from Main Memory to GPU Memory, the data goes through CPU (Core) and then through PCIe interfaces. Transferring data through CPU adds latency and reduces throughput. In addition, the PCIe interface has significantly higher latency and lower throughput than CPU Main Memory Interface.

Unlike traditional interactions between CPU and GPU, as discussed above, the memory module 100 uses DDR interface 30 or 31, rather than the PCIe interface, for data transfer between the processor 102 and the CPU 50. As such, the data transfer in memory module 100 is faster and has less latency than a memory module using a traditional PCIe interface.

For example, the results processed by the processor 102, such as images or computational results, may be stored in the DRAM 104 and the CPU 50 may access the processed results via the interface 30, such as a DDR4 or DDR5 interface. By replacing PCIe interface with the DDR interface, the memory module 100 may reduce the latency and increases the data throughput transferred between the CPU 50 and the processor 102, and between the CPU 50 and the DRAM 104 for the CPU 50 to access the processed results of the processor 102, such as image creation results. The CPU 50 and the processor 102 may communicate via the DDR interface, which is faster and has less latency than a traditional PCIe interface.

In some examples, the memory module 100 may perform AI inferencing. AI inferencing is a process of inferring the data to determine the results. For example, the processor 102 may be configured to perform AI inference, such as by executing an artificial intelligence algorithm or a machine learning model. The memory module 100 with AI inferencing functions may be an AIDIMM. For example, in a host mode, the CPU 50 may write a file to the DRAM 104, for example, using App Direct Mode. The processor 102 may be configured to read the data from the DRAM 104 and make AI inference of the data in the file, for example, to determine what is in the data, using an AI algorithm or model. After the processor 102 completes inferencing the data, the processor 102 may communicate the inferencing results to the CPU. The processor 102 may also save the inferencing results to the DRAMs 104. In this process, the processor 102 may communicate with the CPU 50 and read the data of the file from the DRAM 104 via the interface 30 or 31. The processor 102 in this example may perform functions similar to a GPU.

In another example, the AI algorithm or model may be configured to perform image recognition. When the processor 102 processes the data from the CPU 50 using the AI algorithm or model, the processor 120 may infer an image based on the data received from the CPU 50.

After the processor 102 completes inferencing the data, the processor 102 may communicate the inference results, such as the image created from the data or other computation results of the data, to the CPU 50 via the interface 30 such as DDR4/5 interface. The CPU 50 may also write the results to the DRAM 104. The CPU 50 may also read the results from the DRAM 104. In the process of AI inference, the CPU 50 and processor 102 communicate with each other via the interface 30, which is faster and has less latency than a traditional PCIe interface. With AI inference, the memory module 100 may quickly process the data and be used in any application for increasing the speed of transferring data from the CPU 50 to the processor 102, and vice-versa.

In some examples, the processor 102 may be an FPGA, which includes AI inferencing algorithms or models to perform AI inferencing. In some examples, the memory module 100 may be used as a general coprocessing unit that uses the processor 102. For example, the FPGA may function as a GPU or have coprocessing functions.

In the AI inferencing, feeding the data from the CPU 50 to DRAM 104 and from DRAM 104 to the processor 102 for processing with AI algorithm or model increases the overall speed of processing, and the latency may be improved by up to 100 times from the CPU 50 to the processor 102, such as the FPGA.

By transferring the data with DDR interfaces 30 and 31, the memory module 100 may be used for any application that needs to increase the speed of transferring data between the CPU 50 to the processor 102, or used for computational applications, such as AI inferencing, and for storage applications with the DRAM 104, flash 110, and/or storage flash 112.

Figure 6:
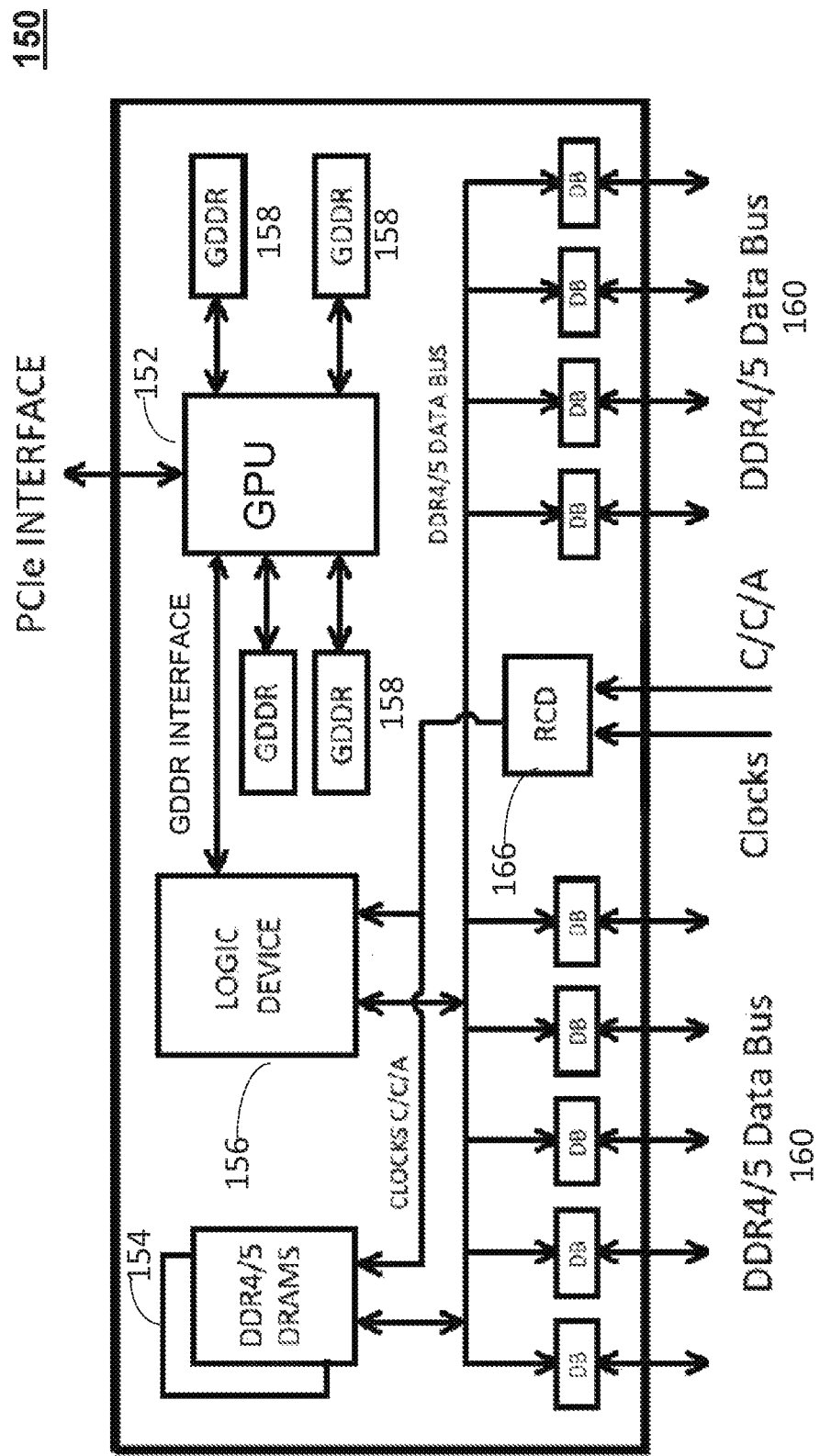
FIG. 6 is a block diagram showing a structure of the memory module according to another embodiment of the present disclosure.

FIG. 6 is a block diagram showing a structure of the memory module according 150 according to another embodiment. As well, the memory module 150 increases the bandwidth and reduce the latency of the data transfer between the CPU memory (DDR4/5) and the GPU memory 154 (GDDR). As will be appreciated, aspects of the proposed architecture have data travel from the CPU DDR4/5 memory through the CPU 50 and through the PCIe interface.

In an exemplary embodiment, the AIGPU DIMM memory 150 is connected directly to the DDR4 Interface. As will be appreciated, in operation, the CPU 50 will copy the data directly from Main Memory to the GPU Memory 154 via a DRAM interface. The CPU 50 will copy the results directly from the GPU Memory 154 to the Main Memory via the DRAM interface.

In the example of FIG. 6, the GPU 152 uses data and software stored in the GDDR 158 to process the data and provide results. The logic device 156 converts data from DDR4/5 protocol to GDDR protocol. The DDR4/5 DRAMS 154 on the DIMM 150 store data for the logic device 156. The DIMM 150 is the module that plugs into the CPU memory slot creating an DDR4/5 interface and the DIMM contains all the components. The data bus (DB) 160 buffers the DDR4/5 data of the CPU DDR4/5 memory. The RCD 166 registers or buffers the clocks and command signals of the CPU DDR4/5 memory.

With the DIMM 100 being connected to the CPU memory slot, when the RCD 166 gets a command from the CPU 50, the data from the CPU memory comes in through the data bus 160 and is buffered. The data is forwarded to the DDR4/5 DRAMs on the DIMM 100 and into the logic device 156. The logic device 156 converts the data from DDR4/5 memory protocol to a GDDR memory protocol. The GPU 152 then reads the data from the logic device 156 and transfers the data to one of the GDDR memory devices 158. The GPU 152 uses the data in the GDDR memory 158 to perform AI or GPU functions. When the GPU 152 is completed processing data, the results goes back to the GDDR 158. The logic device 156 converts the results to DDR4/5 protocol for transfer by the DB back to the CPU 150 on the external DDR4/5 data bus to provide the results to the CPU 50. As will be appreciated, this avoids using the PCIe interface to handle the data flow and increases processing by using faster processing elements. For artificial intelligence applications, the data rate increases the capability of AI processes by increasing the number of transactions executed.

As discussed above, the CPU 50 or the processor 102 may read data from or write data to memory module 100 or 150. The memory module 100 or 150 may be a dual in-line memory module (DIMM), or a AIDIMM, or a TERADIMM.

Figure 7:
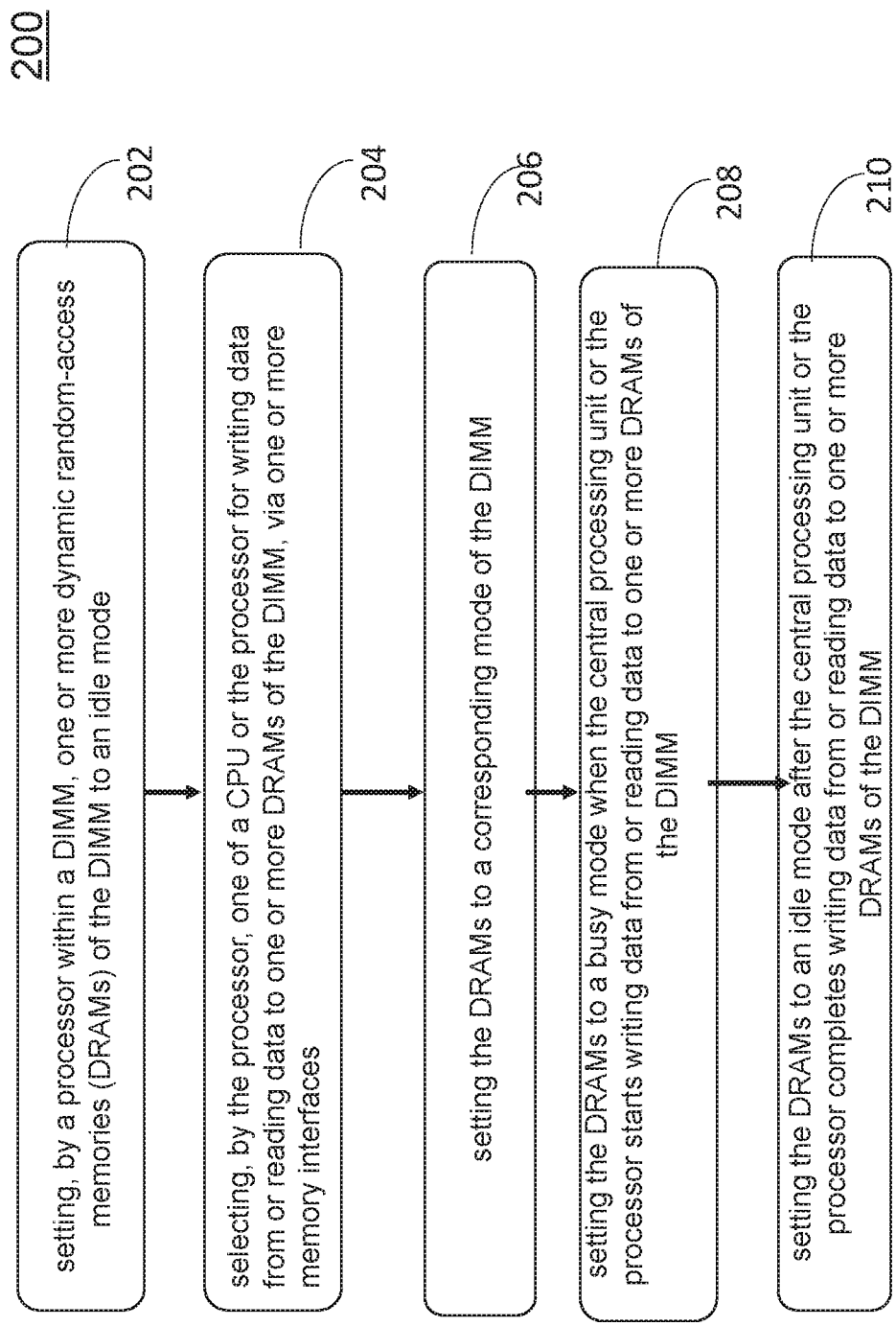
FIG. 7 is a flow chart showing a process of the processor and CPU selection for write and read data.

In the example of FIG. 7, at step 202, the processor 102 or GPU 152 may set one or more dynamic random-access memories (DRAMs) 104 of the memory module 100 to an idle mode to indicate that the DRAM 104 is available for write or read. At step 204, the processor 102 may select one of the CPU 50 or the processor 102 to write data to or to read data from the DRAMs 104 of the memory module 100, via one or more memory interfaces 30 or 31.

At step 206, the processor 102 may set the DRAMs 104 to a corresponding mode of the memory module 100 when the data is read or written to the DRAMs 104. For example, at step 208, the processor may set the DRAMs 104 to a busy mode when the CPU 50 or the processor writing data from or reading data to one or more DRAMs of the memory module.

At step 210, the processor 102 may set the DRAMs 104 to an idle mode after the CPU 50 or the processor 102 completes writing data from or reading data to one or more DRAMs of the memory module 100.

Figure 8:
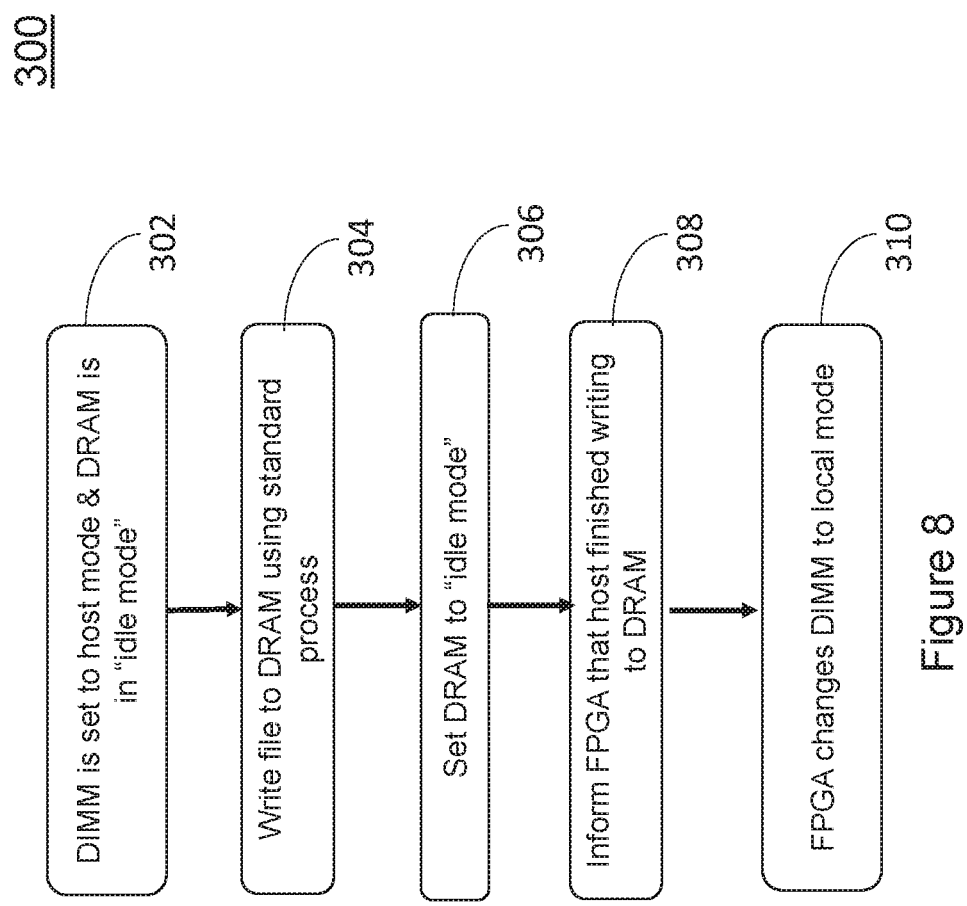
FIG. 8 is a flow chart showing a write process of the memory module in a host mode.

FIG. 8 illustrates a write process 300 in a host mode. The memory module 100 may be a DIMM, and the processor 102 may be an FPGA. At step 302, the processor 102 may set the memory module 100 to a local mode and one or more dynamic random-access memories (DRAMs) 104 of the memory module 100 to an idle mode. At step 304, the CPU 50 may write data to the DRAMs 104 of the memory module 100, via the memory interface 31 such as double data rate 4 (DDR4) interfaces or double data rate 5 (DDR5) interfaces, using a standard process. After the CPU 50 writes data to the DRAMs 104, at step 306, the CPU 50 may set the DRAMs 104 to an idle mode, indicating that the DRAMs 104 is available for write or read operation. At step 308, the CPU 50 may notify the processor 102 that the CPU 50 has completed write data to the one or more DRAMs 104. At step 310, the processor 102 may set the memory module 100 to a local mode and set the state of the DRAMs 104 to idle.

Figure 9:
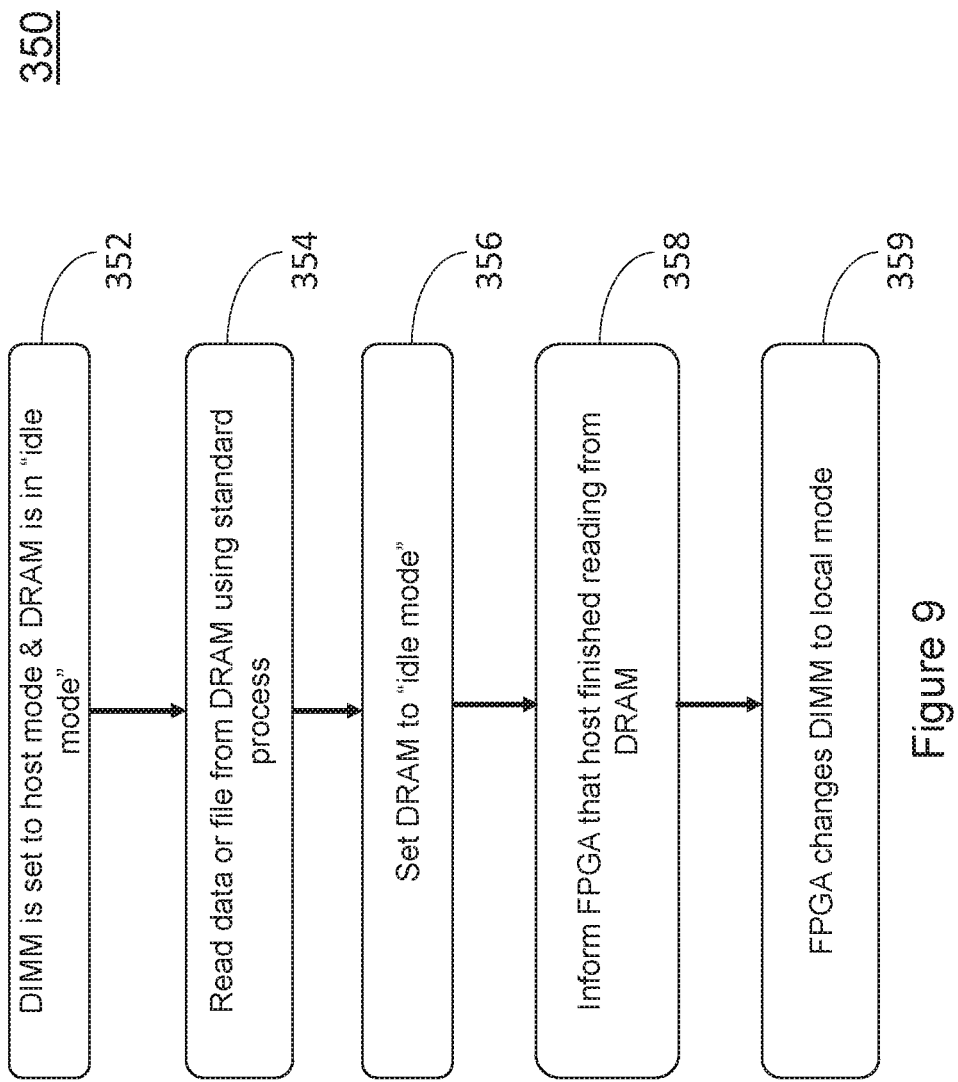
FIG. 9 is a flow chart showing a read process of the memory module in a host mode.

FIG. 9 illustrates a read process 350 in a host mode. The memory module 100 may be a DIMM, and the processor 102 may be an FPGA. At step 352, the processor 102 may set the memory module 100 to a host mode and DRAMs 352 to an idle mode. At step 354, the CPU 50 may read data or file from the DRAMs 104 via the memory interfaces 30, which may be a DDR4 or DDR5 interface. After the CPU 50 completes reading data from DRAM 104, the CPU 50 may set the state of DRAM 104 to idle, indicating that the DRAM 104 is available for read or write operation.

At step 358, the CPU 50 may notify the processor 102 after the CPU 50 has completed reading data from the DRAMs 104. At step 359, the processor 102 may set the memory module 100 to a host mode.

Figure 10:
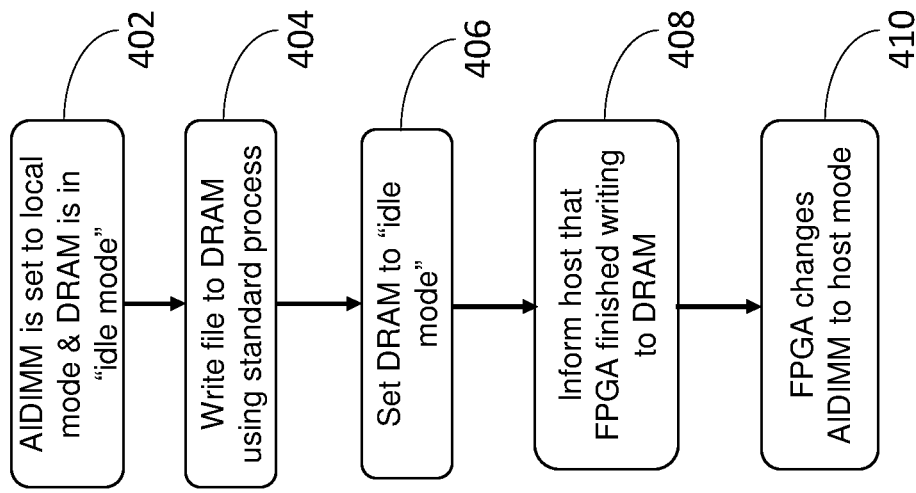
FIG. 10 is a flow chart showing a write process of the memory module in a local mode.

FIG. 10 illustrates an exemplary write process 400 in a local mode. The memory module 100 may be a DIMM, and the processor 102 may be an FPGA. At step 402, the processor 102 may set the memory module 100 to a local mode and the DRAMs 104 of the memory module 100 to an idle mode to indicate that the DRAM 104 is available for write or read. At step 404, the processor 102 may write data to the DRAMs 104 of the memory module 100, via the memory interface 31 such as double data rate 4 (DDR4) interfaces or double data rate 5 (DDR5) interfaces, using a standard process and protocol. After the processor 102 writes data to the DRAMs 104, at step 406, the processor 102 may set the DRAMs 104 to an idle mode, indicating that the DRAMs 104 is available for write or read operation. At step 408, the processor 102 may notify the CPU 50 that the CPU 50 has completed write data to the DRAMs 104. At step 410, the processor 102 may set the memory module 100 to a host mode.

Figure 11:
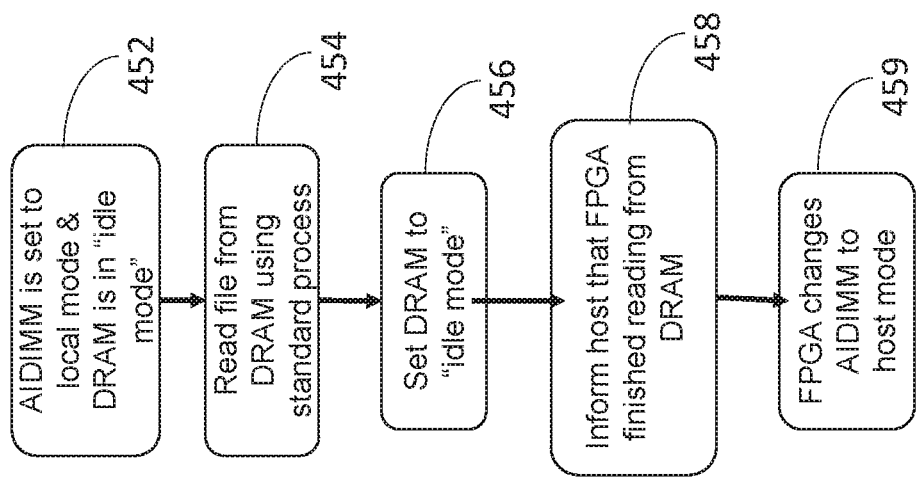
FIG. 11 is a flow chart showing a read process of the memory module in a local mode.

FIG. 11 illustrates an exemplary read process 450 in a local mode. The memory module 100 may be a DIMM, and the processor 102 may be an FPGA. At step 452, the processor 102 may set the memory module 100 to a local mode and DRAMs 352 to an idle mode. At step 454, the processor 102 may read data or file from the DRAMs 104 via the memory interfaces 31, which may be a DDR4 or DDR5 interface, using a standard process and protocol. After the processor 102 completes reading data from DRAM 104, at step 456, the processor 102 may set the state of DRAM 104 to idle, indicating that the DRAM 104 is available for read or write operation. At step 458, after the processor 102 has completed reading data from the DRAMs 104, the processor 102 may notify the CPU 50 that the read operation is complete. At step 459, the processor 102 may set the memory module 100 to a host mode.

Certain adaptations and modifications of the described embodiments can be made. Therefore, the above discussed embodiments are considered to be illustrative and not restrictive.

What is claimed is:

1. A method, comprising:
   communicating, by a processor in a memory module, with an external Central Processing Unit (CPU) via a communications interface;
   receiving, by the processor, data from the external CPU;
   storing, by the processor, the data in one or more dynamic random-access memories (DRAMs);
   instructing, by the processor, one or more multiplexers in the memory module to restrict external CPU write and read accesses to the one or more DRAMs;
   performing, by the processor, one or more operations on the data stored in the one or more DRAMs;
   writing, by the processor, results from the one or more operations into the one or more DRAMs;
   instructing, by the processor, the one or more multiplexers to allow external CPU write and read accesses to the one or more DRAMs;
   communicating, by the processor, to the external CPU that the results are located in the one or more DRAMs.

2. The method of claim 1, wherein the communications interface is a double data rate 4 (DDR4) interface.

3. The method of claim 1, wherein the communications interface is a double data rate 5 (DDR5) interface.

4. The method of claim 1, wherein each of the CPU and the processor has a respective master memory interface, wherein the DRAM has a slave memory interface, and wherein each respective master memory interface communicates with the slave memory interface.

5. The method of claim 1, wherein the memory module is in local mode when the processor instructs the one or more multiplexers in the memory module to restrict external CPU write and read accesses to the one or more DRAMs.

6. The method of claim 1, wherein the memory module is in host mode when the processor instructs the one or more multiplexers in the memory module to allow external CPU write and read accesses to the one or more DRAMs.

7. The method of claim 1, wherein the one or more multiplexers include a multiplexer for switching command, control, and address (CCA).

8. The method of claim 1, wherein the one or more multiplexers include a multiplexer for controlling access to the one or more DRAMs.

9. The method of claim 1, wherein the one or more operations perform image recognition on the data, and wherein the results are the results of the image recognition.

10. The method of claim 1, wherein the one or more operations are AI inferencing algorithms or models to perform AI inferencing.

11. A memory module, comprising:
   a communications interface configured to facilitate communications between a processor in the memory module, with an external Central Processing Unit (CPU), the processor receives data from the external CPU via the communications interface;
   one or more dynamic random-access memories (DRAMs) configured to store the data;
   one or more multiplexers that are configured to restrict external CPU write and read accesses to the one or more DRAMs under instruction of the processor;
   the processor is further configured to:
      perform one or more operations on the data stored in the one or more DRAMs;
      write results from the one or more operations into the one or more DRAMs;
      instruct the one or more multiplexers to allow external CPU write and read accesses to the one or more DRAMs; and
      communicate to the external CPU that the results are located in the one or more DRAMs.

12. The memory module of claim 10, wherein the communications interface is a double data rate 4 (DDR4) interface.

13. The memory module of claim 10, wherein the communications interface is a double data rate 5 (DDR5) interface.

14. The memory module of claim 11, wherein each of the CPU and the processor has a respective master memory interface, wherein the DRAM has a slave memory interface, and wherein each respective master memory interface communicates with the slave memory interface.

15. The memory module of claim 11, wherein the memory module is in local mode when the processor instructs the one or more multiplexers in the memory module to restrict external CPU write and read accesses to the one or more DRAMs.

16. The memory module of claim 11, wherein the memory module is in host mode when the processor instructs the one or more multiplexers in the memory module to allow external CPU write and read accesses to the one or more DRAMs.

17. The memory module of claim 11, wherein the one or more multiplexers include a multiplexer for switching command, control, and address (CCA).

18. The memory module of claim 11, wherein the one or more multiplexers include a multiplexer for controlling access to the one or more DRAMs.

19. The memory module of claim 11, wherein the one or more operations perform image recognition on the data, and wherein the results are the results of the image recognition.

20. The memory module of claim 11, wherein the one or more operations are AI inferencing algorithms or models to perform AI inferencing.

21. A computing device, comprising:
one or more memory modules, each memory module comprising:
a communications interface configured to facilitate communications between a processor in the memory module, with an external Central Processing Unit (CPU), the processor receives data from the external CPU via the communications interface;
one or more dynamic random-access memories (DRAMs) configured to store the data;
one or more multiplexers that are configured to restrict external CPU write and read accesses to the one or more DRAMs under instruction of the processor;
the processor is further configured to:
perform one or more operations on the data stored in the one or more DRAMs;
write results from the one or more operations into the one or more DRAMs;
instruct the one or more multiplexers to allow external CPU write and read accesses to the one or more DRAMs; and
communicate to the external CPU that the results are located in the one or more DRAMs.

22. The computing device of claim 21, wherein the one or more operations are AI inferencing algorithms or models to perform AI inferencing.

* * * * *

UNITED STATES PATENT AND TRADEMARK OFFICE
CERTIFICATE OF CORRECTION

PATENT NO. : 12,112,069 B2
APPLICATION NO. : 18/080720
DATED : October 8, 2024
INVENTOR(S) : John Michael Smolka et al.

Page 1 of 1

It is certified that error appears in the above-identified patent and that said Letters Patent is hereby corrected as shown below:

In the Claims

Column 13
Claim 12: Line 1: Delete "claim 10" and insert --claim 11--

Column 13
Claim 13: Line 4: Delete "claim 10" and insert --claim 11--

Signed and Sealed this
Twenty-sixth Day of November, 2024

Katherine Kelly Vidal
*Director of the United States Patent and Trademark Office*